United States Patent Office 3,708,558
Patented Jan. 2, 1973

3,708,558
MONOCHLORINE ESTER OF 3-OCTADECYLOXY-PROPANOL-(1)-PHOSPHORIC ACID
Gunter Kny, Nassau (Lahn), and Otto Westphal, Freiburg im Breisgau, Germany, assignors to Boehringer Ingelheim G.m.b.H., Ingelheim am Rhein, Germany
No Drawing. Filed Feb. 23, 1971, Ser. No. 118,083
Claims priority, application Germany, Feb. 27, 1970, P 20 09 341.8
Int. Cl. C07f 9/08; A01n 9/36
U.S. Cl. 260—945               1 Claim

ABSTRACT OF THE DISCLOSURE

The monocholine ester of 3-octadecyloxy-propanol-(1)-phosphoric acid of the formula

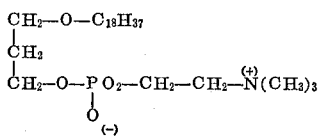

which is useful as an immunologic adjuvant.

---

This invention relates to a novel compound, namely, the monocholine ester of 3-octadecyloxy-propanol-(1)-phosphoric acid, as well as to a method of preparing this compound.

More particularly, the present invention relates to the novel monocholine ester of 3-octadecyloxy-propanol-(1)-phosphoric acid of the formula

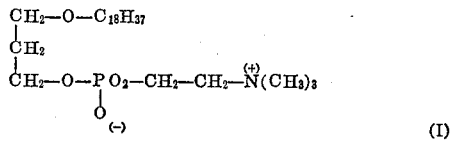

which is a loose amorphous powdery substance without a sharply defined, characteristic melting point behavior; therefore its characterization is established through thin-layer chromatography ($R_f$-value) and elemental analysis.

The compound defined by Formula I above is prepared by alkylating 1,3-propanediol with an octadecyl halide or sulfate to form the monoether, 3-octadecyloxy-propanol-(1) of the formula

reacting the said monoether with phosphoric acid β-bromoethyl ester dichloride to form the β-bromoethyl ester of 3-octadecyloxy-propanol-(1)-phosphoric acid of the formula

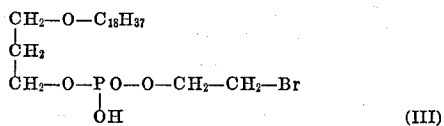

aminating the phosphate III with trimethylamine and, by removal of bromide ions, converting the amination product into the internal salt of the Formula I.

The following example further illustrates the present invention and will enable others skilled in the art to understand it more completely.

EXAMPLE 1

(a) 3-octadecyloxy-propanol-(1)

2.3 gm. (0.1 mol) of sodium were dissolved in 38 gm. (0.5 mol) of anhydrous 1,3-propanediol, 57 gm. (0.15 mol) of n-octadecyl iodide were added to the solution, and the mixture was heated at 150° C. for 16 hours, while vigorously stirring. Thereafter, the reaction mixture was allowed to cool, whereupon 200 ml. of ether and 100 ml. of petroleum ether (boiling point range 30–50° C.) were added, the mixture was thoroughly shaken, and the liquid was decanted from the viscous brown precipitate which had formed. The precipitate was dried with sodium sulfate, yielding 48.7 gm. of the raw reaction product. The raw product was taken up in ether, whereby the major amount of the diether formed as a side product, as well as some of the unreacted octadecyl iodide, remained behind undissolved. The supernatant ether solution was separated and evaporated, and the evaporation residue was chromatographed on 250 gm. of silicagel, initially in pure petroleum ether (30–50° C.)/ether (1:1), whereby the pure monoether, having an $R_f$-value of 0.35, was obtained as a colorless substance. Recrystallization from petroleum ether (boiling point range 30–50° C.) yielded 10.5 gm. (32% of theory) of colorless crystalline 3-octadecyloxy-propanol-(1), M.P. 50–51° C.

(b) Monocholine ester of 3-octadecyloxy-propanol-(1)-phosphoric acid

A solution of 6.6 gm. (20 millimols) of 3-octadecyloxy-propanol-(1) in 50 ml. of chloroform was added slowly dropwise to a solution of 4.4 gm. (75 millimols) of triethylamine and 4.8 gm. (20 millimols) of the mono-β-bromoethyl ester of phosphoric acid dichloride, while stirring and cooling the latter solution on an ice bath. Thereafter, the reaction solution was allowed to warm to room temperature and then to stand at room temperature for 24 hours. Subsequently, the solution was again cooled to 0° C. and, while stirring, 30 ml. of aqueous 0.1 N potassium chloride were added dropwise. The resulting solution was allowed to stand at room temperature for one hour, whereupon 50 ml. of methanol were added and the pH was adjusted to about 3 with concentrated sulfuric acid. The acidic mixture was thoroughly shaken for a few minutes, and then the organic phase was separated in a separating funnel. The residue of the organic phase separation was dried first over magnesium sulfate and then over phosphorus pentoxide in a high vacuum. The raw bromoethyl ester thus obtained was taken up in absolute benzene, and the undissolved ammonium salts were separated by vacuum filtration. Evaporation of the filtrate yielded 10.4 gm. of a light-yellow wax-like substance which, without intermediate chromatographic purification, was dissolved in 200 ml. of absolute chloroform. 15 ml. of condensed trimethylamine were added to the solution, and the mixture was stirred for three days at room temperature. Thereafter, the reaction solution was evaporated, and the residue was reprecipitated from chloroform by addition of acetone, yielding 10.4 gm. of raw 3-octadecyloxy-propanol - (1) - phosphoric acid monocholine ester bromide in the form of a colorless powder. In order to remove the bromide ions, this raw product was dissolved in 300 ml. of methanol, and the resulting solution was vigorously shaken for 30 minutes at room temperature with 3 gm. of silver acetate, and the mixture was then filtered. Evaporation of the filtrate yielded 9.2 gm. of the raw choline ester.

1.0 gm. of the raw ester was chromatographed on 200 gm. of silicagel in chloroform/methanol/water (65:25:4), yielding the purified choline ester with an $R_f$-value of 0.20. Upon reprecipitation with acetone from chloroform, the pure monohydrate of the monocholine ester of 3-octadecyloxy-propanol-(1)-phosphoric acid was obtained as a snow-white powder. The overall yield was 70% of theory.

*Analysis.*—Calcd. for $C_{26}H_{58}O_6NP$, mol. wt. 511.7 (as monohydrate) (percent): C, 61.03; H, 11.42; N, 2.74; P, 6.05. Found (percent): C, 61.38; H, 11.14; N, 2.72; P, 5.98.

The compound of the present invention has useful pharmacological properties. More particularly, it is not metabolized by phospholipase B in the organism of warm-blooded animals; it exhibits interfacial activities and, upon parenteral administration, leads to an alteration of the interfacial activity of cell membranes in the animal organism. While higher concentrations produce cytolytic phenomena, such as hemolysis, a dosage-dependent alteration of the membrane interfacial activity is observed at sublytic dosage levels. Thus, the compound of the instant invention is useful as an immunologic adjuvant in warm-blooded animals, such as mice.

In immunology, adjuvants are understood to be substances which, when mixed with an antigen, enhance antigenicity and increase the immune response of the organism to an antigenic stimulus, i.e. the formation of antibodies. With the aid of adjuvants it is, for instance, possible to counteract the so-called immunoparalysis, that is, to initiate the formation of antibodies even with those antigens which are otherwise tolerated by the organism.

The immunologic adjuvant activity of the compound of the present invention was ascertained as follows:

(1) The test was carried out in analogy to the method of Dresser [Immunology 9 (1965) 261]. The basic principle of this test procedure consists in the inducement of tolerance by means of a soluble protein. This test procedure determines the ability of substances to increase the immune response in the organism against the extremely weak immunogenic bovine gammaglobulin (BGG) to the degree that antibodies for this protein may be clearly proven. For this purpose, mice are administered a 5 mgm. dose of centrifuged, aggregate-free BGG by intraperitoneal injection. Normally, with this dose no antibodies are detectable after 8 to 10 days, which means that the animals are not immunized, and under these conditions they are incapable of an immune response to BGG. However, administration of BGG in combination with an immunologic adjuvant prevents the temporary development of tolerance, and the animals then form antibodies against BGG which they normally tolerate. Some 10 to 12 days following initial administration of the tolerific protein, BGG labeled with iodine-125 is again injected. If the animals are tolerant, the labeled antigen is slowly broken down similar to endogenous gammaglobulin. On the other hand, if the animals are immune, a so-called immune elimination takes place, i.e. the labeled antigen is removed from the circulation at a much more rapid rate. Thus, the speed of elimination of iodine-125-labeled BGG is a measure of antibodies formation.

In tests with the compound of the instant invention it was found that animals treated with labeled BGG and the compound of the Formula I eliminated the tracer protein from the circulation about 10 to 100 times faster than saline-treated controls.

(2) Another immunologic-test method for antibodies by which immunologic adjuvant properties can be determined is based on the principle that the immunogen (BBG) is coupled with erythrocytes, and the thus treated cells are incubated for 20 hours at 4° C. with serum in a geometric series of dilution. If the serum contains antibodies, the erythrocyte agglutinates. The highest concentration at which this phenomenon can still be observed is known as the antibody-titer of the serum.

This considerably less accurate method, however, also clearly proved that the compound of this invention is a highly active immunologic adjuvant.

For pharmaceutical purposes the compound of the Formula I is administered to warm-blooded animals perorally or parenterally, but preferably by intraperitoneal injection, as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective immunologic adjuvant dosage unit of the compound of the instant invention is from 0.5 to 10 mgm./kg. body weight, depending upon the degree of potentiation of immune response desired.

The following examples illustrate a few dosage unit compositions comprising the compound of the Formula I as an active ingredient and represent the best modes contemplated of putting the invention into practical use. The parts are parts by weight unless otherwise specified.

EXAMPLE 2

Coated pills

The pill core composition is compounded from the following ingredients:

| | Parts |
|---|---|
| 3 - octadecyloxy-propanol - (1) - phosphoric acid monocholine ester monohydrate | 100.0 |
| Secondary calcium phosphate, anhydrous | 73.0 |
| Corn starch | 55.0 |
| Polyvinylpyrrolidone | 5.0 |
| Carboxymethyl cellulose | 5.0 |
| Magnesium stearate | 2.0 |
| Total | 240.0 |

Preparation: The monocholine phosphate is intimately admixed with calcium phosphate and the corn starch, the resulting mixture is moistened with an ethanolic 10% solution of the polyvinylpyrrolidone, the moist mass is forced through a 1.5 mm.-mesh screen, the resulting granulate is dried at 45° C. and again passed through the screen, the dry granulate is uniformly admixed with the carboxymethyl cellulose and the magnesium stearate, and the finished composition is compressed into 240 mgm.- pill cores which are subsequently coated with a thin shell consisting essentially of a mixture of talcum and sugar. Each coated pill contains 100 mgm. of the monocholine phosphate and is an oral dosage unit composition with effective immunologic adjuvant action.

EXAMPLE 3

Tablets

The tablet composition is compounded from the following ingredients:

| | Parts |
|---|---|
| 3 - octadecyloxy-propanol - (1)-phosphoric acid monocholine ester monohydrate | 200.0 |
| Lactose | 100.0 |
| Corn starch | 80.0 |
| Polyvinylpyrrolidone | 12.0 |
| Cellulose, microcrystalline | 54.0 |
| Magnesium stearate | 4.0 |
| Total | 450.0 |

Preparation: The monocholine phosphate is intimately admixed with the lactose, the corn starch and the polyvinylpyrrolidone, the mixture is moistened with water; the moist mass is forced through a 1.5 mm.-mesh screen, dried at 45° C. and again passed through the screen; the resulting dry granulate is uniformly admixed with the cellulose and the magnesium stearate, and the finished composition is compressed into 450 mgm.-tablets. Each tablet contains 200 mgm. of the monocholine phosphate and is an oral dosage unit composition with effective immunologic adjuvant action.

EXAMPLE 4

Drop solution

The solution is compounded from the following ingredients:

| | Parts |
|---|---|
| 3 - octadecyloxy - propanol - (1) - phosphoric acid monocholine ester monohydrate | 1.0 |
| Methyl p-hydroxybenzoate | 0.035 |
| Propyl p-hydroxybenzoate | 0.015 |
| Propyleneglycol | 45.0 |
| Oil of anise | 0.05 |
| Methanol | 0.05 |
| Saccharin sodium | 1.0 |
| Ethanol | 1.0 |
| Distilled water, q.s.ad 100.0 parts by vol. | |

Preparation: The propyleneglycol is admixed with 45 parts of distilled water, and the monocholine phosphate is dissolved in the mixture (solution A). The p-hydroxybenzoates, the methanol and the oil of anise are dissolved in the ethanol (solution B). Solutions A and B are admixed, the saccharin sodium is added, and the resulting solution is diluted with distilled water to the indicated volume and filtered. 1 ml. of the filtrate (about 20 drops) contains 10 mgm. of the monocholine phosphate and is an oral dosage unit composition with effective immunologic adjuvant action.

EXAMPLE 5

Hypodermic solution

The solution is compounded from the following ingredients:

| | Parts |
|---|---|
| 3 - octadecyloxy-propanol - (1) - phosphoric acid-(3)-monocholine ester monohydrate | 50.0 |
| Polypropyleneglycol | 2500.0 |
| Tartaric acid | 15.0 |
| Distilled water, q.s.ad 5000.0 parts by vol. | |

Preparation: 2000 parts of distilled water are heated to about 50° C., and then the indicated amount of polypropyleneglycol is added thereto; thereafter, the monocholine phosphate and the tartaric acid are dissolved therein, and the resulting solution is diluted with additional distilled water to the indicated volume. The finished solution is filtered until free from suspended particles, and the filtrate is filled into 5 ml.-ampules which are then sealed and sterilized. Each ampule contains 50 mgm. of the monocholine phosphate, and the contents thereof are an intraperitoneally injectable dosage unit composition with effective immunologic adjuvant action.

The amount of active ingredient in illustrative Examples 2 through 5 may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claim.

We claim:
1. The compound of the formula

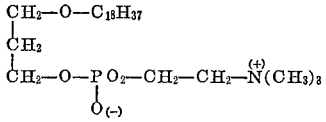

No references cited.

LEWIS GOTTS, Primary Examiner
A. H. SUTTO, Assistant Examiner

U.S. Cl. X.R.

260—973, 614 R; 424—211

UNITED STATES PATENT OFFICE
CERTIFICATE OF CORRECTION

Patent No. 3,708,558    Dated January 2, 1973

Inventor(s) Gunter Kny et al.

It is certified that error appears in the above-identified patent and that said Letters Patent are hereby corrected as shown below:

Column 1, in the title "MONOCHLORINE" should read -- MONOCHOLINE --. Column 3, line 62, "(BBG)" should read -- (BGG) --.

Signed and sealed this 12th day of February 1974.

(SEAL)
Attest:

EDWARD M. FLETCHER, JR.
Attesting Officer

C. MARSHALL DANN
Commissioner of Patents